United States Patent [19]
Blanc et al.

[11] Patent Number: 5,651,076
[45] Date of Patent: Jul. 22, 1997

[54] SYSTEM FOR DETERMINING THE BIDIMENSIONAL CHARACTERISTIC FUNCTION OF A CONTINUOUS OPTICAL CONVERSION MEMBER

[75] Inventors: Hervé Blanc; Jean Glasser, both of Trebeurden, France

[73] Assignee: France Telecom, Paris, France

[21] Appl. No.: 431,422

[22] Filed: May 1, 1995

[30] Foreign Application Priority Data

May 4, 1994 [FR] France ................................. 94 05573

[51] Int. Cl.$^6$ .................................................. G01M 11/00
[52] U.S. Cl. ........................................ 382/141; 356/124.5
[58] Field of Search ................... 382/141; 359/227, 359/197, 649; 356/372, 121, 446, 124.5; 364/553

[56] References Cited

U.S. PATENT DOCUMENTS 3,938,892 2/1976 Klingman, III ..................... 356/124
4,701,782 10/1987 Duvent ................................ 358/227

OTHER PUBLICATIONS

"An Accurate Method for Measuring the Spatial Resolution of Integrated Image Sensory", by J. Glasser et al, *Image Processing*, pp. 40–47, Sep. 19–21, 1988.

*Primary Examiner*—Leo Boudreau
*Assistant Examiner*—Brian P. Werner
*Attorney, Agent, or Firm*—Laubscher & Laubscher

[57] ABSTRACT

A light source produces a light beam which is projected through a pattern to form a light beam incident on a surface of a continuous member. The pattern defines two transparent and opaque surfaces delimited by an angle. An opto-electronic device converts luminosity levels of elementary areas of a resultant image produced by the continuous member in a response to the incident light beam into respective electrical signal levels. A calculator calculates a bidimensional partial derivative for the electrical signal level corresponding to each elementary area of the resultant image as a function of the electrical signal levels produced by the opto-electronic device in response to respective luminosity levels of elementary areas contiguous to said each elementary area in order to produce the characteristic function. The optical member can be an optical instrument, a photographic film, a photoconductor or photoreceiver drum or, more generally, any optical image conversion device.

12 Claims, 3 Drawing Sheets

SYSTEM FOR DETERMINING THE BIDIMENSIONAL CHARACTERISTIC FUNCTION OF A CONTINUOUS OPTICAL CONVERSION MEMBER

BACKGROUND OF THE INVENTION

1. Field of the Invention

The present invention concerns a system for determining the bidimensional characteristic function of a continuous optical conversion member.

2. Description of the Prior Art

The continuous optical conversion member is an optical instrument or opto-electronic image-forming means such as, for example, a lens, a photographic object, a photographic film, an optical fiber or a photoconductor drum of a photocopier, facsimile machine or printer. The bidimensional characteristic function allows quantification of the deterioration of images produced by the continuous member in response to illumination thereof, and in particular a measurement of the attenuation in the contrast of these images as a function of the spatial frequency of optical waves illuminating the continuous member. In the case of lenses, photographic films and photoconductor drums, for example, the images produced are respectively optical images, photographic negatives and images printed on paper.

FIGS. 1 and 2 show a system for determining the bidimensional characteristic function of a discrete photosensitive cell. The system comprises a lamp 10, a focusing and collimating optical device 11, a pattern MIRE from FIG. 2, a drive means 12 for moving the pattern in two directions, an image analyzer 13 of which one of the photosensitive cells $CP_{1,1}$ to $CP_{N,P}$ is to be characterized, and a calculator 14.

Referring to FIG. 2, the pattern MIRE is a rectangular plate transparent at wavelengths of a light beam, for example a glass plate, one side of which has a plane surface S2 which is opaque at 46 wavelengths, as shown by the shaded area. This opaque surface is delimited by the edges of the plate and the sides of an angle greater than 180° facing one corner of the plate. In the illustrated embodiment, the angle greater than 180° is equal to 270° and has an apex with coordinates (xi,yj) in a Cartesian system of axes (x,y) in the plane of the pattern. The opaque surface S2 is obtained by depositing a thin layer of aluminum, for example, in the shape of a dihedron having a "thickness" substantially equal to half of one of the dimensions, width or length, of the plate. The surface S1 complementary to the opaque surface S2 on the plate is delimited by a complementary angle less than 180°, equal to 90° in the illustrated embodiment, and is transparent. In an alternative embodiment, the transparent and opaque nature of the surfaces S1 and S2 are interchanged, the opaque surface being then a rectangular surface portion with a right angle less than 180° at the apex (xi,yj).

A light beam produced by the lamp 10 is projected through the optical device 11 to form a collimated light beam collimated on one side of the pattern. The edges of the glass plate constituting the pattern are trapped in a frame fastened to the moving member of a vertical motorized micrometer table constituting the drive means 12 so that the pattern can be moved in two directions orthogonal to the optical axis AA' of the device 11 and situated in a plane parallel to and a few centimeters away from the plane of the discrete photosensitive cells $CP_{1,1}$ to $CP_{N,P}$ of the analyzer 13. One cell $CP_{n,p}$ from the cells $CP_{1,1}$ to $CP_{N,P}$ is substantially coincident with the apex of the angle less than 180° on the pattern for a given position of the pattern. The illumination passing through the pattern is null "0" via the opaque surface S2 and maximal "1" via the transparent surface S1. A first portion of the sensitive surface of the photosensitive cell $CP_{n,p}$ therefore receives a maximal illumination "1" and a second portion of the sensitive surface receives a null illumination "0". Accordingly, an image of the pattern is formed on the surface of the photosensitive cell. These first and second portions of the sensitive surface of the photosensitive cell $CP_{n,p}$ are delimited, like the first and second surfaces S1, S2 of the pattern (FIG. 2), by the sides of a right angle greater than or less than 180°. For given coordinates (xi,yj) of the apex of the right angle greater than 180° on the opaque surface of the pattern, the photosensitive cell $CP_{n,p}$ produces an electrical signal $R_{xi,yj}$ whose amplitude is equal to:

$$R_{xi,yj} = \int_x \int_y c(x,y) \cdot I(x,y) \cdot dx \cdot dy,$$

where x and y are two variables respectively defined by the width and height of the sensitive surface of the photosensitive cell, $C(x,y)$ is the bidimensional characteristic function of the photosensitive cell, with $c(\infty)=0$, and $I(x,y)$ is the illumination function defined by:

$$\begin{cases} I(x,y) = \text{``1''} \text{ for } x \geq xi \text{ and } y \geq yj, \\ I(x,y) = \text{``0''} \text{ for } x < xi \text{ and } y < yj. \end{cases}$$

Let $R_{u,v}$ be the two-variable continuous function associated with the previously mentioned two-variable discrete function $R_{xi,yj}$ and defined for any pair (u,v) in the system of axes (x,y) in the plane of the pattern.

$$\frac{\partial}{\partial u} (R_{u,v})$$

$$\int_x \int_y \frac{\partial}{\partial u} c(x,y) \cdot I(u,v) \cdot dx \cdot dy$$

therefore: $\int_y dy \int_x \frac{\partial}{\partial u} c(x,y) \cdot I(u,v) \cdot dx$ therefore: $\int_v^{+\infty} dy \int_u^{+\infty} \frac{\partial}{\partial u} c(x,y) dx,$ because $I(x,y) = \text{``1''}$ for $x>u$ and $y>v$.

This last result can be written:

$$\frac{\partial}{\partial u} (R_{u,v}) = \int_v^{+\infty} dy \cdot [c(x,y)]_u^{+\infty} = -\int_v^{+\infty} c(u,y) dy. \quad (1)$$

The partial derivative with respect to v of the function defined by equation (1) is equal to:

$$\frac{\partial^2}{\partial u \partial v} (R_{u,v}) = -\frac{\partial}{\partial v} \int_v^{+\infty} c(u,y) \cdot dy,$$

-continued i.e.: $\frac{\partial^2}{\partial u \partial v} (R_{u,v}) = -\int_v^{+\infty} -\frac{\partial}{\partial v} c(u,y)dy = c(u,v)$ Consequently, the double partial derivative of the function $R_{u,v}$ with respect to u and v is equal to C(u,v).

This remarkable mathematical result is applied to the previously defined discrete function $R_{xi,yj}$ in the following way.

Under the control of the calculator 14, the drive means 12 moves the pattern MIRE in the plane of the pattern, which is the plane of the Cartesian system of axes (x,y). The apex of the angle greater than 180° of the opaque surface S2 of the pattern is therefore located at several successive positions with abscissae xi such that $x1 \leq xi \leq xI$ and ordinates yj such that $y1 \leq yj \leq yJ$, coinciding with respective discrete points of an area including the sensitive surface of the photosensitive cell $CP_{n,p}$ to be characterized and a strip at the edge of this sensitive surface. The discrete points define a matrix grid in this area. The characteristic function of the photosensitive cell is defined on a surface or area having dimensions substantially greater than those of the sensitive area of the photosensitive cell. The definition of this substantially greater area is the result of charge leaking between adjacent photosensitive cells and other physical phenomena.

Respective electrical signals $R_{xi,yj}$ are obtained at the output of the analyzer 13 for these several positions (xi,yj) and the amplitudes of the electrical signals are stored in the calculator in the form of a matrix $(R_{xi,yj})_{\substack{1 \leq i \leq I \\ 1 \leq j \leq J}}$.

Calculation of differential slopes in x and then in y is performed for each of the elements of the matrix function $(R_{xi,yj})_{\substack{1 \leq i \leq I \\ 1 \leq j \leq J}}$ thereby obtaining a matrix of values approximating the characteristic function C(x,y) at respective points (xi,yj). Smoothing this matrix of values yields the required characteristic function C (x, y).

The aforementioned calculation and smoothing steps can be interchanged. In this case a function defined by the previously mentioned continuous function $R_{u,v}$ is obtained by smoothing the matrix $(R_{xi,yj})_{\substack{1 \leq i \leq I \\ 1 \leq j \leq J}}$.

The characteristic function C(x,y) is deduced from this continuous function $R_{u,v}$ by double partial. differentiation of $R_{u,v}$ with respect to x and y.

Accordingly, the prior art is restricted to characterizing a discrete optical member in the form of one or more photosensitive cells, for example. The function of a photosensitive cell is to convert incident light energy into electrical energy. One known form of photosensitive cell is the photodiode. This is in the form of a junction between a p-doped silicon substrate and a thin diffused area of n-doped silicon, the junction being covered with an insulative layer of silicon oxide.

OBJECT OF THE INVENTION

The main object of this invention is to provide a system for determining the bidimensional characteristic function of a continuous optical conversion member, in contrast to the prior art system for characterizing a discrete optical member such as a photosensitive cell. In response to illumination, a continuous optical conversion member produces a resultant image rather than an electrical signal representative of the received illumination.

SUMMARY OF THE INVENTION

According to a first embodiment, a system for determining the bidimensional characteristic function of a continuous optical conversion member, comprises a light source producing a light beam, a pattern comprising transparent and opaque surfaces delimited by an angle, optical means receiving the light beam for forming a light beam incident on a surface of the continuous optical conversion member through the pattern, opto-electronic conversion means for converting luminosity levels of elementary areas of a resultant image produced by the continuous optical conversion member in response to the incident light beam into respective electrical signal levels, and means for calculating a bidimensional partial derivative for the electrical signal level corresponding to each of the elementary areas of the resultant image as a function of the electrical signal levels produced by the opto-electronic conversion means in response to respective luminosity levels of elementary areas contiguous to each elementary area thereby providing the bidimensional characteristic function.

According to a second embodiment, a system for determining the bidimensional characteristic function of a continuous optical conversion member, comprises a light source producing a light beam, a pattern comprising reflecting and absorbing surfaces delimited by an angle, optical means receiving the light beam for forming a light beam incident on a surface of the continuous optical conversion member after reflecting on the reflecting surface of the pattern, opto-electronic conversion means for converting luminosity levels of elementary areas of a resultant image produced by the continuous optical member in response to the incident light beam into respective electrical signal levels, and means for calculating a bidimensional partial derivative for the electrical signal level corresponding to each elementary area of the resultant image as a function of the electrical signal levels produced by the optoelectrical conversion means in response to respective luminosity levels of elementary areas contiguous to each elementary area in thereby providing the bidimensional characteristic function.

Preferably, the determining system embodying the invention comprises a drive means controlled by the calculator means for moving a sensor which is included in the optoelectronic conversion means, in two directions parallel to respective sides of the pattern surface angle. The sensor is successively positioned by the driven means at bidimensionally identified positions respectively defining the elementary areas of the resultant image.

Typically, the angle is substantially equal to a right angle, i.e. an angle less than 180° and equal to 90° or an angle greater than 180° and equal to 270°.

The continuous optical conversion member can be an optical instrument, the resultant image being an optical image. It may also be a photographic film, the resultant image being a photographic negative projected onto the opto-electronic conversion means. According to a latter example, the continuous optical conversion member is a photoconductive surface, the resultant image being the projection onto the opto-electronic conversion means of an image printed on paper.

BRIEF DESCRIPTION OF THE DRAWINGS

The foregoing and other features and advantages of the present invention will be apparent more clearly from a reading of the following description of preferred embodiments of the invention with reference to the corresponding accompanying drawings in which.

DESCRIPTION OF THE PREFERRED EMBODIMENTS

Figure 1:
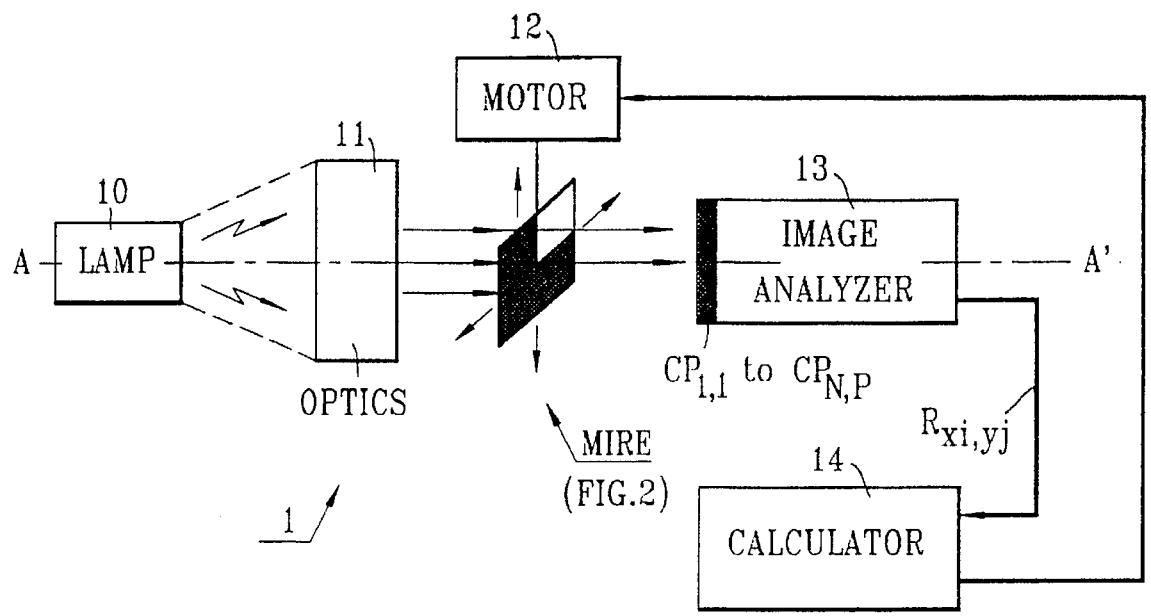
FIG. 1, already commented on, is a block diagram of a system for determining the bidimensional characteristic function of a photosensitive cell in accordance with the prior art.
Figure 2:
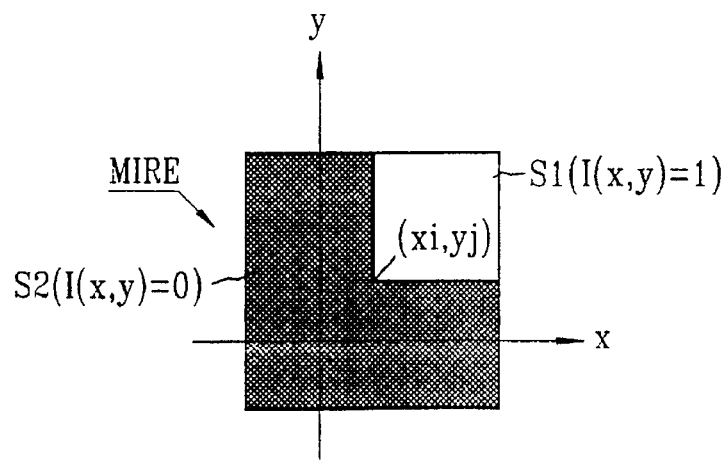
FIG. 2, also already commented on, is a front view of a pattern of the system shown in FIG. 1.
Figure 3:
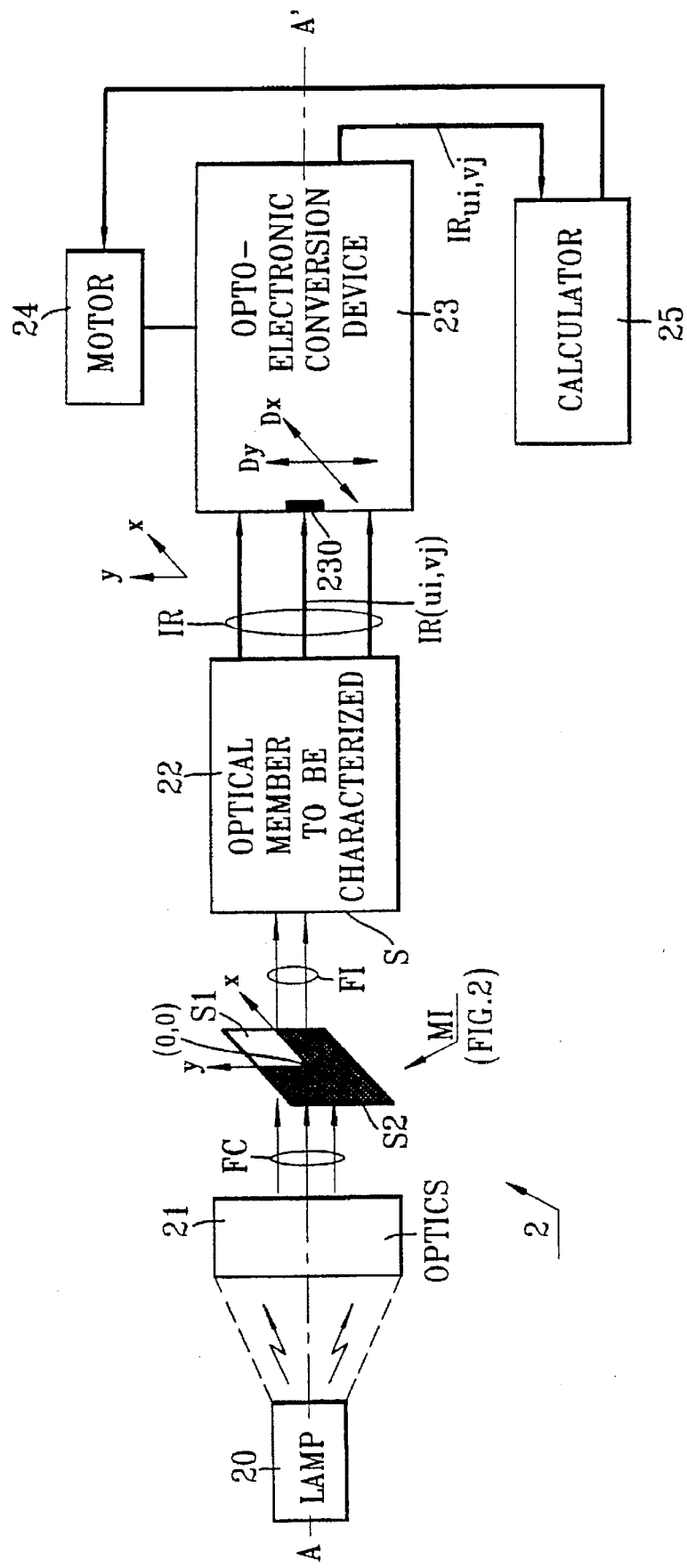
FIG. 3 is a block diagram of a system of the invention for determining the bidimensional characteristic function of a continuous optical conversion member.
Figure 4:
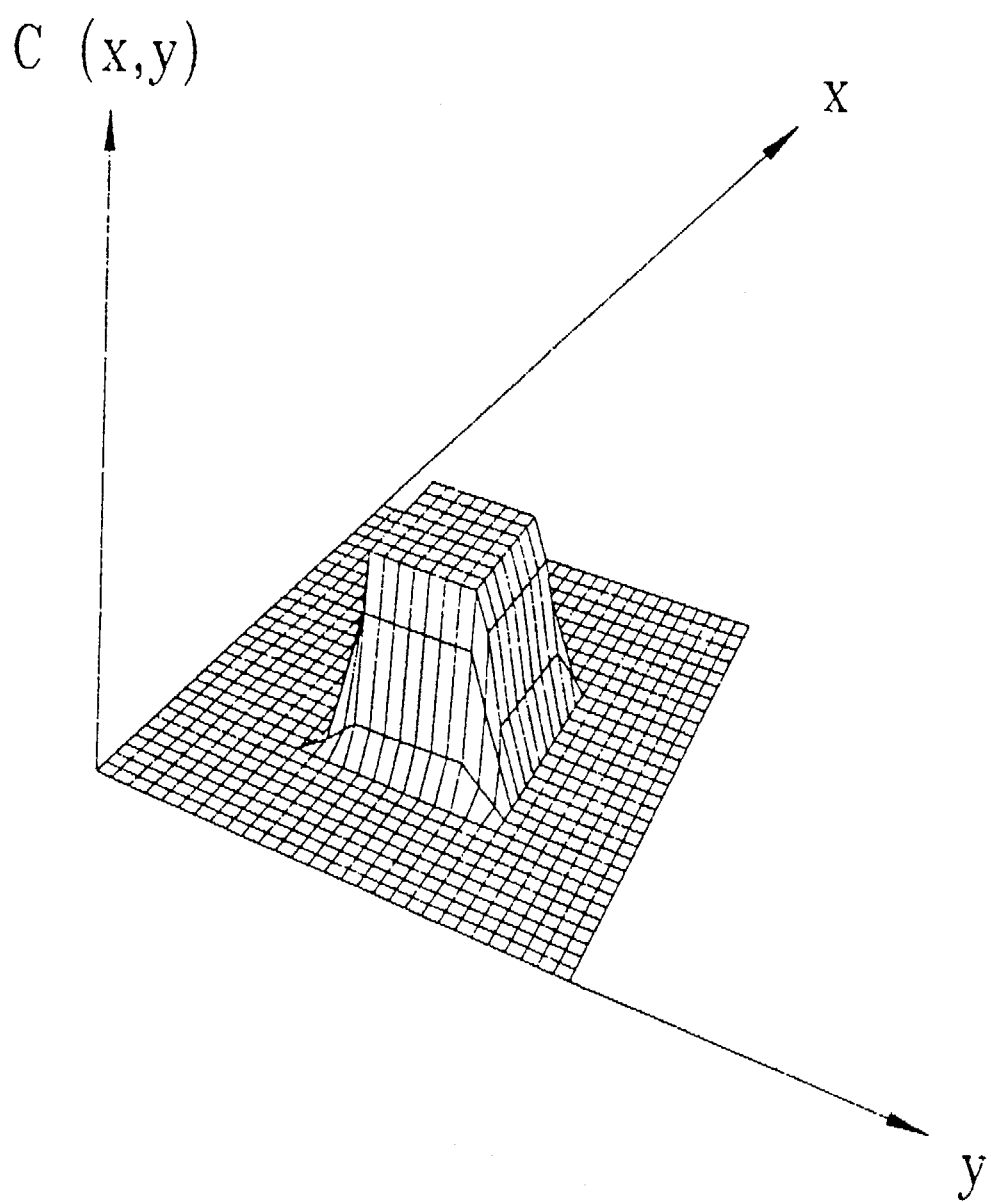
FIG. 4 is a graphical representation of a bidimensional characteristic function.

Referring to FIG. 3, a determining system 2 of the invention comprises a lamp 20, a focusing and collimating optical device 21, a pattern MI of the type shown in FIG. 2 and described in the preamble of the description, a continuous optical conversion member 22 to be characterized, an optic-electronic conversion device 23, drive means (motor) 24 and a calculator 25. The lamp 20, the optical device 21, the pattern MI and the member 22 to be characterized are fixed and disposed in succession transversely to the optical axis AA' of the optical device 21. The lamp 20 produces a light beam which is collimated by the optical device 21 to form a collimated light beam FC collimated on one side of the pattern MI. The apex of the angle between the transparent and opaque surfaces S1 and S2 of the pattern MI is located at the origin (x=0,y=0) of a fixed Cartesian system of axes (x,y) orthogonal to the axis AA'. On passing through the fixed pattern MI the light beam FC is converted into an incident light beam FI having a luminous intensity function I (x,y) such that:

$$\begin{cases} I(x,y) = \text{``1''} \text{ for } x \geq 0 \text{ and } y \geq 0, \\ I(x,y) = \text{``0''} \text{ for } x < 0 \text{ and } y < 0 \end{cases}$$

where "1" and "1" respectively denote maximal and null luminous intensities.

The incident light beam FI is projected onto a surface S of the continuous optical conversion member 22 to be characterized which in response produces a resultant image IR.

The optical member can be a lens, a photographic objective, a photographic film, an optical fiber or a photocopier photoconductor drum, for example. Depending on the nature of the optical member 22, the resultant image IR then consists in an optical image, a photographic negative or an image printed on paper.

A photoconductor drum of a photocopier; has a photoconductive surface which is electrically charged prior to a photocopying operation. On this photoconductive surface the illuminated areas are discharged whereas the areas which remain dark remain charged. These areas which remain charged attract a dry ink which is printed onto the paper. In this case, as with a photographic negative, the image printed on paper is illuminated by a light source such as a lamp in order to project it onto the opto-electronic conversion device 23.

Referring again to FIG. 3, the resultant image IR is defined at each point with coordinates (u,v) in the system of axes (x,y) by a luminous intensity function IR (u,v) such that:

$$IR(u,v) = \int_x \int_y C(x,y) \cdot I(x-u, y-v) \cdot dx \cdot dy,$$

where C(x,y) is the bidimensional characteristic function of the optical member 22, and I(x,y) is the previously defined intensity function.

The image IR is scanned by an opto-electronic sensor 230 in the conversion device 23 with the sensor located at a plurality of successive positions defining a substantially matrix grid on the resultant image IR. This matrix grid of the resultant image IR is obtained by stepwise displacement of the device 23 fixed to a drive arm of the drive means 24, in two directions Dx and Dy orthogonal to the axis AA' and respectively parallel to the sides of the angle of the pattern MI. The displacement increments of the opto-electronic sensor in the two directions Dx and Dy are made substantially equal to the respective sides of the integrating surface of said opto-electronic sensor. The drive means 24 under the control of the calculator 25 position the sensor 230 at successive positions along successive lines which are parallel to the direction Dx of the grid, for example.

For each position of the sensor 230 the conversion device 23 produces a respective electrical signal level $IR_{ui,vj}$ which is a function of the luminosity level $IR_{(ui,vj)}$ of an elementary area in the resultant image IR that is observed by the sensor 230 at the position. i and j denote two indices respectively varying between 0 and I and between 0 and J, and (I,J) denotes the dimensions of the matrix grid. The luminosity level $IR_{(ui,vj)}$ corresponds to the level of the luminous intensity function IR(u,v) for a discrete point (u=ui, v=vj) of the resultant image.

These IJ signal levels $IR_{ui,vj}$ are transmitted in succession to the calculator 25 which memorizes them in the form of a matrix function $$(IR_{ui,vj})_{\substack{0 \leq i \leq I \\ 0 \leq j \leq J}}.$$

The calculator 25 calculates differential slopes in u and v, i.e. bidimensional partial derivatives, at each signal level of the matrix function $$(IR_{ui,vj})_{\substack{0 \leq i \leq I \\ 0 \leq j \leq J}}.$$

to produce a matrix of discrete values approximating the characteristic function C(x, y). The bidimensional partial derivative for a given signal level of the matrix function corresponding to a given position of the sensor 230 and therefore to an elementary area in the resultant image IR is calculated as a function of the electrical signal levels produced by the conversion device 23 in response to respective luminosity levels of elementary areas contiguous to the given elementary area. The calculator can apply smoothing to the matrix of discrete values approximating the characteristic function C(x, y) to obtain a corresponding continuous function.

The foregoing result can be explained mathematically in the following manner. Let IR(u, v) be the continuous function previously explained and associated with the matrix function $$(IR_{ui,vj})_{\substack{0 \leq i \leq I \\ 0 \leq j \leq J}}.$$

The partial derivative $$\frac{\partial}{\partial u}(IR(u,v))$$

with respect to u of IR(u,v) is equal to:

$$\int_x \int_y \frac{\partial}{\partial u} c(x,y) \cdot I(x-u, y-v) \cdot dx \cdot dy$$

therefore:

$$\int_y dy \int_x \frac{\partial}{\partial u} c(x,y) \cdot I(x-u, y-v) \cdot dx =$$

$$\int_v^{+\infty} dy \int_u^{+\infty} \frac{\partial}{\partial u} c(x,y) dx,$$

since I(x,y)="1" for x≧0 and y≧0.
The latter result can be written:

$$\frac{\partial}{\partial u}(IR(u,v)) = \int_v^{+\infty} dy \cdot [c(x,y)]_u^{+\infty} = -\int_v^{+\infty} c(u,y) dy. \quad (2)$$

Also, the partial derivative with respect to v of the function defined by equation (2) is written:

$$-\frac{\partial}{\partial v} \int_v^{+\infty} c(u,y) dy$$

i.e.: $-\int_v^{+\infty} \frac{\partial}{\partial v} c(u,y) dy = C(u,v)$

Thus the double partial derivative of the matrix function $$(IR_{ui,vj})_{\substack{0 \leq i \leq I \\ 0 \leq j \leq J}}$$

with respect to u and v approximates the required bidimensional characteristic function C(x,y) of the continuous optical conversion member 22.

The person skilled in the art will realize that the opto-electronic conversion device 23 can be a matrix sensor, for example a CCD (Charge Coupled Device) type sensor in which each photosensitive cell converts one respective of the luminosity electrical signal level $IR_{ui,vj}$. In this implementation no levels of the resultant image elementary areas into an drive means 24 is required.

The person skilled in the art will also realize that, in one embodiment of the invention, the pattern can be formed by a liquid crystal screen of which a first screen portion defining the transparent surface is defined by translucent pixels and a second screen portion defining the opaque surface is formed by black pixels. More generally, any type of screen can be used on which is formed the image of a pattern comprising a transparent surface and an opaque surface separated by a right angle.

Finally, it should be noted that the system 2 of FIG. 3, using a transmission optical configuration, is equivalent to a reflection optical configuration system, not shown. In this equivalent system, the lamp 20, the optical device 21, the optical member 22 to be characterized and the opto-electronic conversion device 23 are disposed on the same side of the pattern MI. The opaque and transparent surfaces of the pattern MI are respectively redefined as absorbing and reflecting surfaces. The portion of the luminous flux of the collimated beam FC reflected from the reflecting surface of the pattern MI is received on the surface S of the member 22 to produce the image IR which is scanned by the opto-electronic conversion device 23.

What we claim is:

1. A system for determining the bidimensional characteristic function of a continuous optical conversion member, said system comprising:
    a light source producing a light beam,
    a pattern comprising transparent and opaque surfaces delimited with respect to each other by two sides of one non-flat angle,
    optical means receiving said light beam for forming a light beam incident on a surface of said continuous optical conversion member through said pattern,
    opto-electronic conversion means for converting luminosity levels of elementary areas of a resultant image produced by said continuous optical conversion member in response to said incident light beam into respective electrical signal levels, and
    means for calculating a bidimensional partial derivative along two directions that are parallel to said two angle sides, respectively, for the electrical signal level corresponding to each said elementary area of said resultant image as a function of said electrical signal levels produced by said opto-electronic conversion means in response to respective luminosity levels of elementary areas contiguous to each said elementary area thereby providing said bidimensional characteristic function.

2. A system as claimed in claim 1, comprising drive means controlled by said calculating means for moving a sensor of said opto-electronic conversion means in said two directions thereby positioning said sensor successively at bidimensionally identified positions respectively defining said elementary areas of said resultant image.

3. The system claimed in claim 1, wherein said angle is substantially equal to a right angle.

4. The system claimed in claim 1, wherein said continuous optical conversion member is an optical instrument and said resultant image is an optical image.

5. The system claimed in claim 1, wherein said continuous optical conversion member is a photographic film and said resultant image is a photographic negative projected onto said opto-electronic conversion means.

6. The system claimed in claim 1, wherein said continuous optical conversion member is a photoconductive surface and said resultant image is the projection onto said opto-electronic conversion means of an image printed on paper.

7. System for determining the bidimensional characteristic function of a continuous optical conversion member, said system comprising
    a light source producing a light beam, a pattern comprising reflecting and absorbing surfaces delimited with respect to each other by two sides of one non-flat angle, optical means receiving said light beam for forming a light beam incident on a surface of said continuous optical conversion member after reflecting on said reflecting surface of said pattern, opto-electronic conversion means for converting luminosity levels of elementary areas of a resultant image produced by said continuous optical conversion member in response to said incident light beam into respective electrical signal levels, and means for calculating a bidimensional partial derivative along two directions that are parallel to said two angle sides, respectively, for the electrical signal level corresponding to each said elementary area of said resultant image as a function of said electrical signal levels produced by said opto-electronic conversion means in response to respective luminosity levels of elementary areas contiguous to each of said elementary areas thereby providing said bidimensional characteristic function.

8. A system as claimed in claim 7, comprising drive means controlled by said calculating means for moving a sensor of said opto-electronic conversion means in said two directions thereby positioning said sensor successively at bidimensional identified positions respectively defining said elementary areas of said resultant image.

9. The system claimed in claim 7, wherein said angle is substantially equal to a right angle.

10. The system claimed in claim 7, wherein said continuous optical conversion member is an optical instrument and said resultant image is an optical image.

11. The system claimed in claim 7, wherein said continuous optical conversion member is a photographic film and said resultant image is a photographic negative projected onto said opto-electronic conversion means.

12. The system claimed in claim 7, wherein said continuous optical conversion member is a photoconductive surface and said resultant image is the projection onto said opto-electronic conversion means of an image printed on paper.

* * * * *